(12) United States Patent  (10) Patent No.: US 8,887,001 B2
Horley et al.  (45) Date of Patent: Nov. 11, 2014

(54) TRACE DATA PRIORITY SELECTION (75) Inventors: John Michael Horley, Cambridge (GB); Michael John Williams, Cambridge (GB); Katherine Elizabeth Kneebone, Cambridge (GB); Alastair David Reid, Fulbourn (GB)

(73) Assignee: ARM Limited, Cambridge (GB)

( * ) Notice: Subject to any disclaimer, the term of this patent is extended or adjusted under 35 U.S.C. 154(b) by 930 days.

(21) Appl. No.: 12/929,744

(22) Filed: Feb. 14, 2011

(65) Prior Publication Data

US 2011/0202801 A1 Aug. 18, 2011

(30) Foreign Application Priority Data

Feb. 17, 2010 (GB) .................................. 1002728.2

(51) Int. Cl.
*G06F 11/00* (2006.01)
*G06F 11/34* (2006.01)

(52) U.S. Cl.
CPC .................................. *G06F 11/348* (2013.01)
USPC ............................................. 714/45; 714/39

(58) Field of Classification Search
CPC G06F 11/3636; G06F 11/3476; G06F 11/348
USPC ..................................................... 714/39, 45
See application file for complete search history.

(56) References Cited

U.S. PATENT DOCUMENTS 7,558,987 B2 * 7/2009 Nardini et al. ................ 714/38.1
2003/0229823 A1 * 12/2003 Swaine et al. .................. 714/25
2008/0016407 A1 1/2008 Abernathy et al.
2008/0016408 A1 * 1/2008 Abernathy et al. ............. 714/45
2008/0046674 A1 2/2008 Bernasconi

FOREIGN PATENT DOCUMENTS

| CN | 101438250 A | 5/2009 |
| GB | 2 391 351 | 2/2004 |
| GB | 2 413 667 | 11/2005 |
| JP | H02-220145 | 9/1990 |
| JP | H06-139105 | 5/1994 |
| JP | H08-083200 | 3/1996 |
| JP | 2004-13897 | 1/2004 |
| JP | 2007-141072 | 6/2007 |
| JP | 2008-523456 | 7/2008 |
| WO | WO 2005/109203 | 11/2005 |
| WO | WO 2007/101972 | 9/2007 |

OTHER PUBLICATIONS

Search Report for UK1002728.2, dated Jun. 14, 2010.
Chinese Office Action dated Sep. 24, 2014 in CN 201110043344.7, 9 pages.

* cited by examiner

*Primary Examiner* — Jigar Patel
(74) *Attorney, Agent, or Firm* — Nixon & Vanderhye P.C.

(57) ABSTRACT

An integrated circuit 2 is provided with a data source 6 in the form of a processor executing program instructions connected via a bus interconnect 16 to a trace output device 8. The trace output device 8 is memory mapped. Different memory addresses that are mapped to the trace output device 8 are associated with different priority levels. Trace data written to at least one memory address has a first level of priority in which it is either accepted or the transfer is stalled until the data can be processed by the trace output device 8. Another level of priority associated with a different memory address is such that the data is always accepted but is discarded if the trace output device 8 does not have the ability to process, e.g. store that data at that time.

17 Claims, 5 Drawing Sheets

| Address Offset | Short Name | Description |
|---|---|---|
| *Guaranteed data accesses* | | |
| 0x00-0x04 | G_DMTS | Data, marked with timestamp, guaranteed |
| 0x08-0x0C | G_DM | Data, marked, guaranteed |
| 0x10-0x14 | G_DTS | Data, with timestamp, guaranteed |
| 0x18-0x1C | G_D | Data, guaranteed |
| 0x20-0x5C | - | Reserved |
| *Guaranteed non-data accesses* | | |
| 0x60-0x64 | G_FLAGTS | Flag with timestamp, guaranteed |
| 0x68-0x6C | G_FLAG | Flag, guaranteed |
| 0x70-0x74 | G_TRIGTS | Trigger with timestamp, guaranteed |
| 0x78-0x7C | G_TRIG | Trigger, guaranteed |
| *Invariant Timing data accesses* | | |
| 0x80-0x84 | I_DMTS | Data, marked with timestamp, invariant timing |
| 0x88-0x8C | I_DM | Data, marked, invariant timing |
| 0x90-0x94 | I_DTS | Data, with timestamp, invariant timing |
| 0x98-0x9C | I_D | Data, invariant timing |
| 0xA0-0xDC | - | Reserved |
| *Invariant Timing non-data accesses* | | |
| 0xE0-0xE4 | I_FLAGTS | Flag with timestamp, invariant timing |
| 0xE8-0xEC | I_FLAG | Flag, invariant timing |
| 0xF0-0xF4 | I_TRIGTS | Trigger with timestamp, invariant timing |
| 0xF8-0xFC | I_TRIG | Trigger, invariant timing |

Rows 0x00–0x7C: First level of priority
Rows 0x80–0xFC: Second level of priority

TRACE DATA PRIORITY SELECTION

This application claims priority to GB Application No. 1002728.2 filed 17 Feb. 2010, the entire contents of which are incorporated herein by reference.

BACKGROUND OF THE INVENTION

1. Field of the Invention

This invention relates to the field of data processing systems. More particularly, this invention relates to data processing systems having the ability to generate trace data output.

2. Description of the Prior Art

It is known in the field of data processing systems to provide mechanisms for generating trace output data. This trace data may be used for diagnostic and debug purposes during the development of hardware and/or software. A problem that arises within such data processing systems is that the volume of trace data can be so large that there are insufficient resources to buffer the trace data on the device when captured and before output and/or insufficient bandwidth to send the trace data out of the device. One way of dealing with this is to discard trace data which it is not possible to buffer or transmit out of the device. However, this suffers from the disadvantage that critical diagnostic information may be present within the discarded trace data. Another possibility is to stall the device until space becomes available within the trace data buffer or capacity becomes available to transmit the trace data off the device. A disadvantage of this approach is that stalling the device, or otherwise changing its timing, may influence the operation of the device in a manner which masks or alters a fault being investigated or introduces additional faults.

SUMMARY OF THE INVENTION

Viewed from one aspect the present invention provides apparatus for processing data comprising:

a data source configured to generate data; and a trace output device coupled to said data source and configured to receive said data from said data source and to output trace data from said apparatus; wherein said data source dynamically selects one of a plurality of priority levels to be associated with said data;

said trace output device is responsive to received data having a first level of priority to one of: (i) if said trace output device is ready to process said data, then accept said data from said data source; and (ii) if said trace output device is not ready to process said data, then stall acceptance, of said data from said data source until said trace output device is ready to process said data; and said trace output device is responsive to received data having a second level of priority to process said data from said data source and, if said trace output device is not able to process said data, then to discard said data.

With this technique the data source is able to select a level of priority to be associated with the trace data sent to the trace output device and the trace output device can respond to this level of priority in order to manage the ability of the trace output device to handle the received trace data. More particularly, trace data having a first level of priority may be accepted by the trace output device if it is ready to process the trace data and if the trace output device is not ready to process the trace data, then the acceptance may be stalled until the trace output device is ready to process the data. Processing the trace data may mean simply storing the trace data in the trace output device. In this way, trace data of the first level of priority will not be lost as acceptance of that trace data will be stalled until the trace output device is ready to process the data. Trace data received by the trace output device having a second level of priority is accepted from the data source, but, if the trace output device is not able to process that trace data, then it is discarded. In this way, the data is accepted in a manner which does not create an impediment to further processing and is discarded by the trace output device if it is not able to process that data. Using these different levels of priority critical trace data can be associated with the first level of priority so that it will be substantially guaranteed to be accepted by the trace output device whereas less critical data can be associated with the second level of priority using which will be accepted from the data source so as to avoid creating impediments to processing and yet will be discarded if the trace output device does not have the capacity to process that trace data at that point in time.

The trace output device may include a data buffer memory configured to store the trace data prior to output of the trace data from the apparatus. The availability or non-availability of storage space within this data buffer memory can be used to control the response of the trace output device to trace data received having the different levels of priority. Trace data received having the first level of priority will be accepted when the data buffer memory has empty capacity sufficient to store that trace data and a stall of acceptance of this data will be triggered when the data buffer memory does not have sufficient capacity to store the trace data at that time.

In respect of trace data having the second level of priority when the data buffer memory does not have sufficient empty capacity to store that trace data, the trace output device will not be able to process that trace data and accordingly it will be discarded.

The ability to process the data may also be determined using a comparison of the space available in the data buffer with a value given by N+F(P), where N is the size in bytes of the data to be stored in the buffer and F(P) is a function of priority level.

One type of embodiment of the present technique uses a data source that is a bus master, a trace output device that is a bus slave and a bus interconnect to couple the data source to the trace output device. This type of arrangement is flexible and allows the designer to place a trace output device substantially anywhere within the system and provide access to that trace output device from various different bus masters which are connected via the bus interconnect.

Communicating with the trace output device may be simplified when the trace output device is a memory mapped slave device mapped to a plurality of memory addresses.

The plurality of memory addresses may be arranged such that writes to different memory addresses are used to associate different priority levels with trace data received by the trace output device. Thus, one memory address mapped to the trace output device may be used to receive data of the first level of priority and a different memory address mapped to the trace output device may be used to receive data of the second level of priority. In this way, data sources may choose (e.g. under software control) to which memory location to write data within the memory region mapped to the trace output device and accordingly dynamically select the priority level to be associated with that data.

In another class of embodiments, the data source may be a main processor and the trace output device may be a coprocessor coupled to that main processor. Within such embodiments data may be sent from the main processor to the coprocessor serving as the trace output device in response to a coprocessor instruction within the instruction stream of the main processor. The coprocessor instructions may specify the priority level to be associated with the data that is being transferred to the coprocessor which serves as the trace output device.

It is possible that a user of a system may configure the system such that too many writes of trace data having the first level of priority, which stall the transfer until they are accepted, are present within the system. In such a situation a build-up of stalls may arise such that the overall forward progress of the processing is substantially impaired and no useful diagnostic or debug information can be gained. In order to provide a mechanism for dealing with such circumstances, the trace output device may be responsive to an override signal to change a level of priority associated with data received by the trace output device. The override signal may thus be used to effectively reduce the level of priority associated with data received by the trace output device in a manner which can avoid that data stalling processing in an undesirable manner.

Viewed from another aspect the present invention provides apparatus for processing data comprising:

data source means for generating data; and trace output means coupled to said data source means for receiving said data from said data source means and for outputting trace data from said apparatus; wherein said data source means dynamically selects one of a plurality of priority levels to be associated with said data;

said trace output means is responsive to received data having a first level of priority to one of: (i) if said trace output means is ready to process said data, then accept said data from said data source means; and (ii) if said trace output means is not ready to process said data, then stall acceptance of said data from said data source means until said trace output device is ready to process said data; and said trace output means is responsive to received data having a second level of priority to accept said data from said data source means and, if said trace output means is not able to process said data, then to discard said data.

Viewed from a further aspect the present invention provides a method of processing data comprising the steps of:

generating data with a data source;

receiving said data from said data source with a trace output device coupled to said data source; and outputting trace data from said apparatus; wherein said data source dynamically selects one of a plurality of priority levels to be associated with said data;

said trace output device is responsive to received data having a first level of priority to one of: (i) if said trace output device is ready to process said data, then accept said data from said data source; and (ii) if said trace output device is not ready to process said data, then stall acceptance of said data from said data source until said trace output device is ready to process said data; and said trace output device is responsive to received data having a second level of priority to accept said data from said data source and, if said trace output device is not able to process said data, then to discard said data.

The above, and other objects, features and advantages of this invention will be apparent from the following detailed description of illustrative embodiments which is to be read in connection with the accompanying drawings.

DESCRIPTION OF THE EMBODIMENTS

Figure 1:
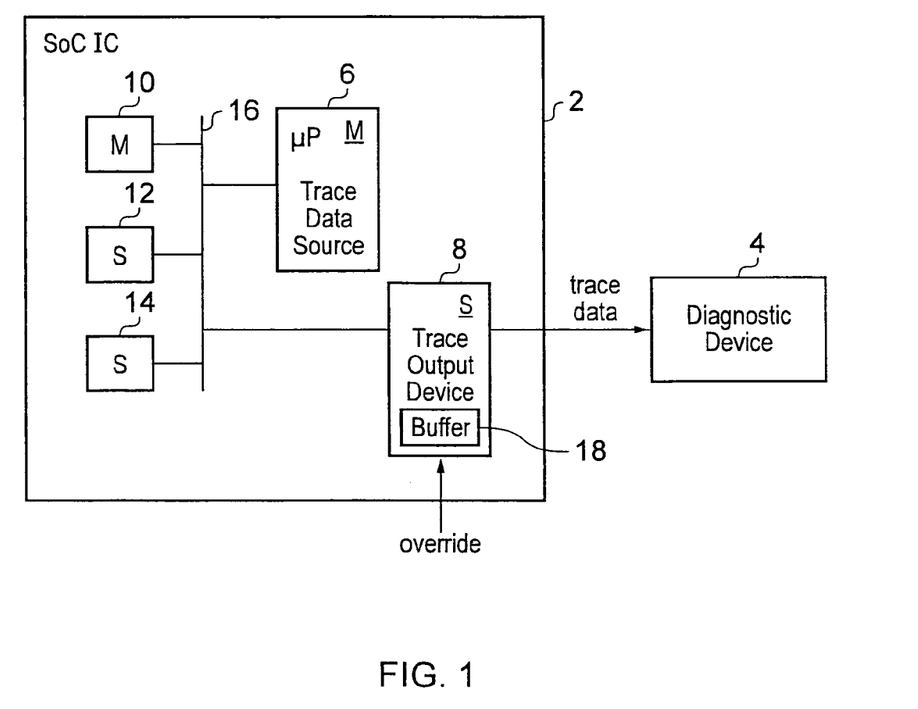
FIG. 1 schematically illustrates a system-on-chip integrated circuit having a trace capability and coupled to a diagnostic device.

FIG. 1 shows a system-on-chip integrated circuit 2 which outputs trace data to a diagnostic device 4. The integrated circuit 2 includes a processor core 6 executing program instructions, a trace output device 8, a further bus master 10 and two further bus slaves 12, 14. The processor 6, the trace output device 8, the master 10 and the slaves 12, 14 are all connected via a bus interconnect 16 (this may vary between a classical shared bus and a point-to-point interconnect). The processor 6 is a bus master and the trace output device is a bus slave.

The trace output device 8 is memory mapped within the memory address space of the system and has a range of memory addresses that are associated with the trace output device 8. A bus master, such as the processor 6 or the bus master 10 (e.g. a DMA unit) may perform a write operation to a destination memory address. If that destination memory address is within the range of memory addresses which are mapped to the trace output device 8, then that write transaction will be passed across the bus interconnect 16 to the trace output device 8. The transmission protocols of the bus interconnect 16 (such as protocols in accordance with the AMBA interconnects designed by ARM Limited) are used to control the transfer across the bus. These transmission protocols permit the receiving slave device, in this case the trace output device 8, to accept the transfer or indicate a stall condition in which the data should be held upon the bus until the slave device is ready to accept that data. When a stall occurs, some or all of the bus interconnect 16 may become unavailable for use by other devices and so the overall ability of the integrated circuit 2 to continue processing may be impaired.

The trace output device 8 includes a data buffer memory 18 into which data written to the trace output device 8 may be stored until it is output to the diagnostic device 4 (directly or in modified such as compressed form). The bandwidth available for output to the diagnostic device 4 may be small and accordingly large amounts of data may need to be buffered within the data buffer memory 18 when observing a period of operation of the integrated circuit 2.

Figure 2:
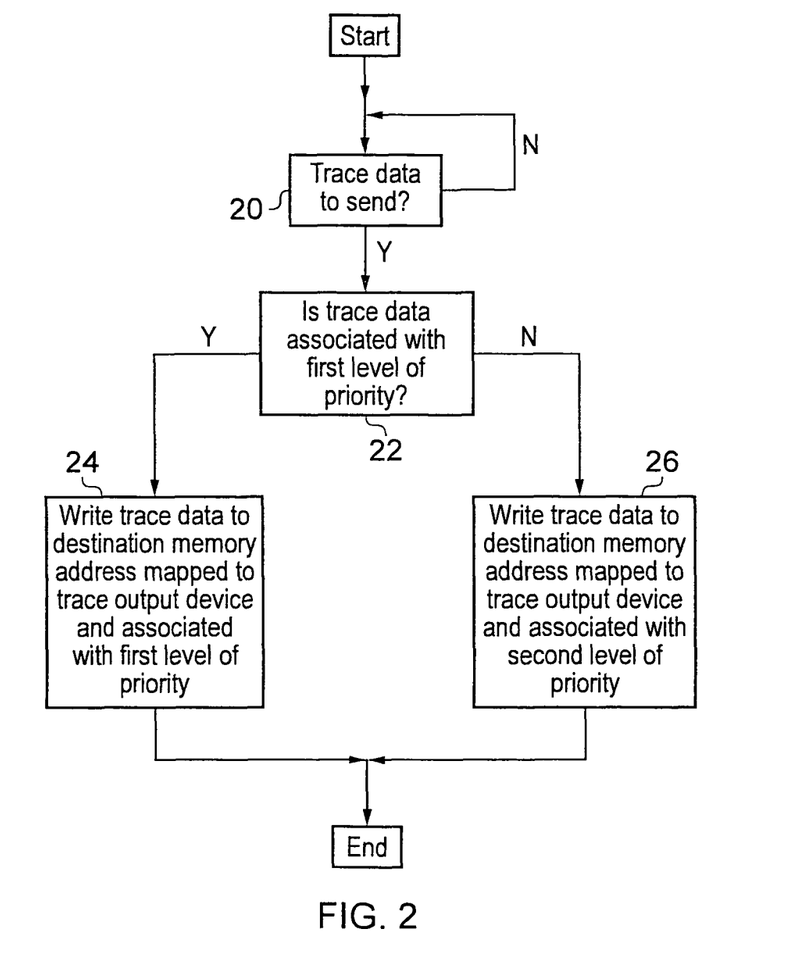
FIG. 2 is a flow diagram schematically illustrating processing performed within a data source to associate a level of priority with data being sent to a trace output device.

FIG. 2 is a flow diagram schematically illustrating processing performed within a data source sending data to the trace output device 8. At step 20 processing waits until there is trace data to be sent. At step 22 it is determined whether the trace data is associated with a first level of priority. If the trace data is associated with the first level of priority, then processing proceeds to step 24 in which that trace data is written to a destination memory address mapped to the trace output device 8 and associated with the first level of priority. If the determination at step 22 was that the trace data was not associated with the first level of priority, then processing proceeds to step 26. At step 26 the trace data is written to a destination memory address mapped to the trace output device 8 and associated with a second level of priority.

From the above it will be seen that the data source (such as the processor 6) operating under software control may dynamically select a priority level to be associated with trace data to be sent. Significant trace data may be given the first level of priority to increase the likelihood that this will be output from the integrated circuit 2 to the diagnostic device 4. Trace data which is less significant, but would be useful if it is possible to output, may be associated with the second level of priority and accordingly will be accepted by the trace output device 8 in a manner which does not stall processing and yet will simply be discarded if there is not the ability to process (e.g. buffer) that trace data.

Figure 3:
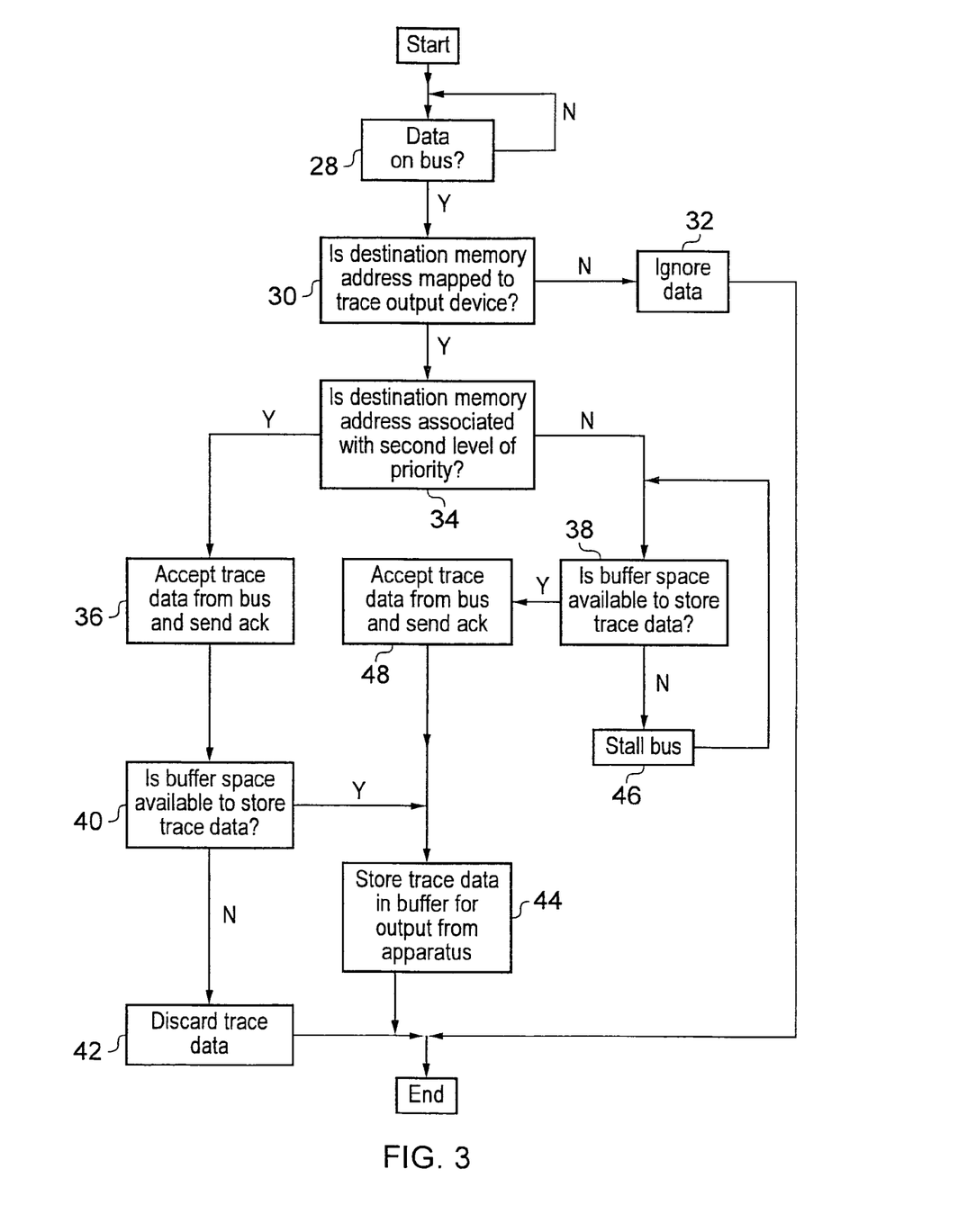
FIG. 3 is a flow diagram schematically illustrating processing performed within a trace output device receiving data, with different levels of priority.

FIG. 3 is a flow diagram schematically illustrating processing performed by the trace output device 8 when receiving trace data. At step 28 the trace output device 8 waits for data to be asserted on the bus interconnect 16. When data is asserted, step 30 determines whether the destination memory address associated with that data is mapped to the trace output device 8. If the destination memory address is not mapped to the trace output device, then that data is destined for another slave device, such as slave device 12 or slave device 14, and processing within the trace output device 8 proceeds to step 32 where the data on the bus is ignored.

If the determination at step 30 was that the destination memory address associated with the data on the bus is mapped to the trace output device 8, then step 34 serves to determine whether or not the particular destination memory address is associated with the second level of priority. If the destination memory address is associated with the second level of priority, then processing proceeds to step 36. If the destination memory address is not associated with the second level of priority, then, in this example embodiment, it will be associated with the first level of priority and processing proceeds to step 38.

At step 36 the trace output device accepts the trace data from the bus and sends back an acknowledgement to the data source. Step 40 determines whether there is space available within the data buffer memory 18 to store that trace data. If there is no space available to store the trace data, then step 42 discards the trace data and processing proceeds. The effect of immediately accepting the trace data from the bus at step 36 is that the bus is freed for further processing. Furthermore, the timing of other processing operations within the integrated circuit 2 will not be affected by whether or not the trace output device 8 does or does not process the trace data of the second level of priority. This is significant as it stops the operations associated with this trace data of the second level of priority altering the behaviour of the integrated circuit 2 in a manner which could mask or alter faults or generate new faults when seeking to perform diagnostic operations.

If the determination at step 40 was that space is available in the data buffer memory 18 to store the trace data, then step 44 stores the trace data for subsequent output from the apparatus into the data buffer memory 18.

If the determination at step 34 was that the destination memory address associated with the data received on the bus interconnect 16 is not associated with the second level of priority, then processing proceeds to step 38 which handles trace data of the first level of priority. Step 38 determines whether there is space available within the data buffer memory 18 to store the trace data. If there is no space currently available, then processing proceeds to step 46 where the bus interconnect 16 is stalled and the trace data held on the bus interconnect 16 until space is available within the data buffer memory 18 to store that trace data (e.g. the data buffer memory 18 is at least partially drained to the diagnostic device 4). In this way, important trace data can be associated with the first level of priority and it may be ensured that it is always written into the data buffer store 18 and thereby captured for analysis even if space is temporarily unavailable within the data buffer store 18.

If the determination at step 38 is that buffer space is available, then processing proceeds to step 48 at which the trace data is accepted from the bus interconnect 16 and an acknowledgement signal is set back to the originating bus master. Processing then proceeds to step 44 where the trace data is stored into the data buffer memory 18.

It will be appreciated that the action of step 46 in stalling the bus interconnect 16, or at least a portion thereof, is intrusive to the overall operation of the integrated circuit 2. It may be that an excessive number of such stall operations arise and that these could be sufficient to impede proper operation of the integrated circuit 2. For this reason, as is illustrated in FIG. 1, an override signal is supplied into the trace output device 8. The action of this override signal when asserted is to alter the priority levels associated with data received by the trace output device 8. Thus, if this override signal is asserted then it is possible for all data received by the trace output device 8 irrespective of its associated destination memory address to be associated with the second priority level so that it will be accepted without causing any stall and will be discarded if there is insufficient ability to process, e.g. store, the data at that time.

It is also possible that the determination of whether or not the data should be accepted for processing (e.g. storage in the data buffer) may be determined by comparing whether empty capacity of the data buffer is greater than or equal to $N+F(P)$, where N is the size of the data to be stored in bytes and $F(P)$ is a monotonically increasing function of the priority level of the data ($F(P)$ may equal zero when P is the highest priority).

Figure 4:
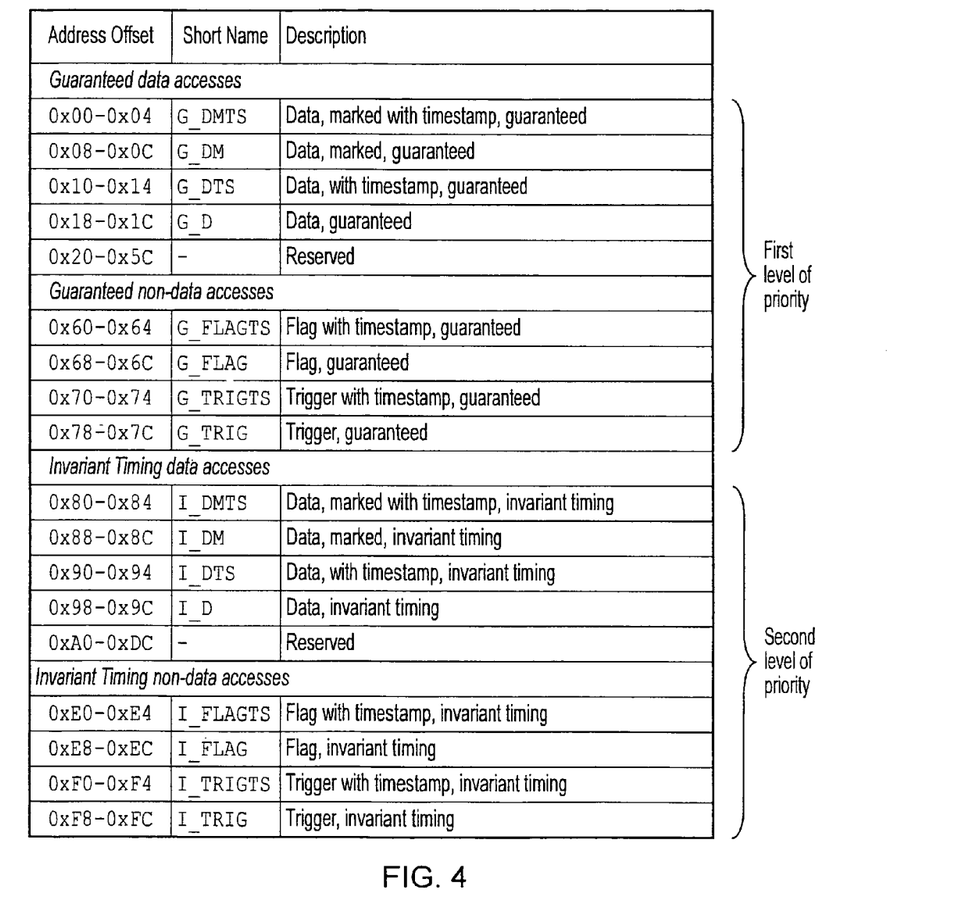
FIG. 4 is a table illustrating how different ranges of memory addresses mapped to a trace output device are associated with different levels of priority and different other attributes.

FIG. 4 is a table illustrating a range of memory addresses which may be mapped to a trace output device 8. The trace output device 8 has a base address associated therewith. FIG. 4 illustrates offsets from that base address which together definite a range of memory addresses associated with that trace output device 8. As illustrated, a first set of these offsets provide memory addresses which are associated with a first level of priority. This first level of priority may be considered as guaranteeing that trace data written to these memory addresses will be output from the trace output device 8, i.e. the trace output device 8 will accept that data or stall the bus until it accepts that data such that the data will ultimately be output from the trace output device to the diagnostic device 4.

A second range of offsets define a range of memory addresses associated with the trace output device 8 which provide the second level of priority such that trace data written to these memory addresses is considered as having the second level of priority. This second level of priority can be considered as providing invariant timing to the operation of the integrated circuit 2 since trace data written to the trace output device 8 with this second level of priority will substantially always be immediately accepted by the trace output device 8 in a manner in which it does not alter the overall timing of the operation of the integrated circuit 2.

It will be seen that within these ranges of memory addresses associated with the first level of priority and the second level of priority, there are further subdivisions of addresses provided to link other characteristics with the trace data written to those addresses. In this example, the received data may be optionally marked and optionally time stamped depending upon the particular memory address to which that data is written within the range of memory addresses mapped to the trace output device 8.

Figure 5:
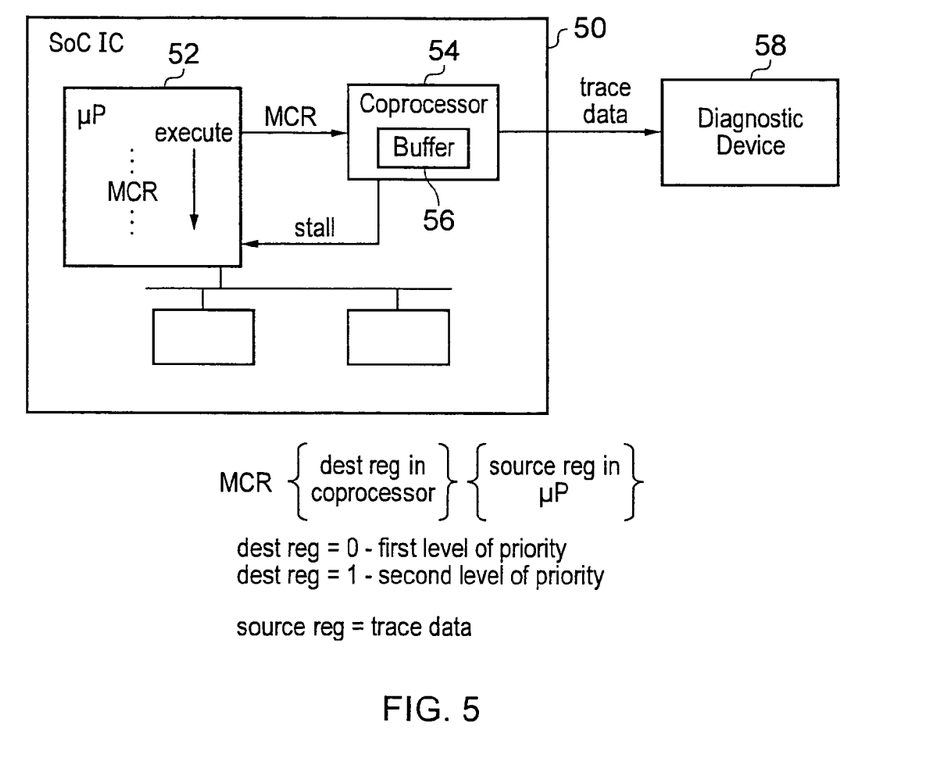
FIG. 5 schematically illustrates another embodiment in which a processor is coupled to a coprocessor which serves as a trace output device.

FIG. 5 is a diagram schematically illustrating another embodiment using the present techniques. In this embodiment a system-on-chip integrated circuit 50 is provided with a processor 52 coupled to a coprocessor 54. The coprocessor 54 serves as a trace output device and includes a data buffer memory 56. The coprocessor 54 sends trace data to a diagnostic device 58.

A coprocessor instruction, such as an ARM MCR instruction, within the instruction stream of the processor 52 serves when executed to send trace data to the coprocessor 54. The encoding of this coprocessor instruction indicates whether the data being transferred to the coprocessor 54 has the first level of priority or the second level of priority. If the data being transferred has the first level of priority and the coprocessor 54 is unable at that point in time to accept the data, e.g. the data buffer memory 56 is full, then the coprocessor 54 issues a stall signal to the processor 54 indicating that the data being transferred should continue to be asserted to the coprocessor 54 until the coprocessor 54 is able to accept that data. Encodings of the MCR instruction which indicate that the data being transferred has the second level of priority control the coprocessor 54 to immediately accept that data and simply discard the data if there is at that time insufficient storage space within the data buffer memory 56.

The instruction encodings of coprocessor instruction may be the ARM MCR instruction with a coprocessor destination register of "0" to indicate a first level of priority and a coprocessor destination register of "1" to indicate a second level of priority. The trace data being transferred from the processor 52 may be stored within a source register of the processor 52, such as a general purpose register within a general purpose register bank of the processor 52.

In the above there have been discussed a first level of priority and a second level of priority. It will be appreciated that the present techniques are not limited to embodiments having only two levels of priority. As an example, it is possible to provide three levels of priority. A first level of priority would be similar to the first level of priority previously discussed in which the data would either be accepted immediately or the acceptance stalled until the trace output device was ready to process that data. A second level of priority may be that the data was always accepted, but is discarded if there is insufficient space within the data buffer memory to store that data. A third level of priority would be that the data was always accepted but was discarded unless there was more than a threshold amount of capacity within the data buffer memory that was empty. Thus, this trace data of the third level of priority would only be stored within a data buffer memory when the data buffer memory was relatively empty thereby preserving empty space within the data buffer memory for the higher priority data of the second level of priority or the first level of priority.

In the case when the data source is a DMA engine, the trace output device is able to interact with a DMA engine to throttle the data being sent to the trace output device. Although it is possible to stall a DMA transfer by stalling the bus, it is likely that a long DMA transfer (e.g. 1000 bytes) would cause the bus to spend most of its time stalled because the DMA can transfer data to the trace output device much faster than the trace output device can send it out the trace buffer. If the trace output device discards DMA data when full, then the trace output device is likely to discard most of the data that the DMA sends to it. This effect is especially undesirable when the DMA engine is being used to send large quantities of low priority data since stalling the bus for a long time to send low priority data would severely impact program behaviour and/or ability to send higher priority data and discarding large quantities of data is likely to render the remaining data useless.

In order to address this problem there is provided a mechanism to limit the rate at which data is sent to the trace output device:

1) A rate-limiting mechanism may be present in the DMA's source of data. e.g., if the DMA is copying data from a slow peripheral to the buffer memory then there should be no problem.

2) A rate-limiting mechanism could be added to the DMA engine. For example, a DMA engine could have a counter which counts cycles between transfers on each channel and only sends data when the counter reaches some threshold or a 'leaky bucket' mechanism could be used (i.e. As data arrives it is stored in a "bucket"/buffer. If the "bucket" is full, then newly arriving data is discharged. Data is emptied from the "bucket" at a constant rate.)

3) A rate-limiting mechanism building on the above described techniques and having a feedback mechanism from the trace output device back to the DMA.

Known DMA engines provide handshake lines that allow a peripheral to indicate whether they are ready to accept a transaction (read or write). The trace output device can use these handshake lines to request more data from a DMA engine as follows:

For each channel:
Let P be the priority of the channel.
Let N be the number of bytes required to store the trace data.
If N+g(P) bytes are available in the trace output device's buffer and there is no outstanding request on that channel:
The trace output device uses the handshake lines to request data on that channel.
The trace output device sets a flag on that channel indicating that there is an outstanding request.
The DMA engine responds by sending data on that channel.

When data arrives on some channel, a decision is made as to whether to accept or discard that data and the 'outstanding request flag for that channel is cleared. If the data is stalled, the flag is not cleared until the data is finally accepted (clearing the flag allows the trace output device to trigger another request if sufficient space exists in the buffer).

The latency means that the trace output device may have space for data now but, by the time the data arrives from the DMA, there may not be enough space. At this stage, the trace output device would either stall or discard the data. To reduce the chance of this happening, the threshold for requesting data using the handshake lines should be higher than the threshold for accepting data. Having G(P)>F(P) means that if data is requested using the handshake lines, there is a high(er) probability that it will be accepted immediately when it is received. The difference between 'G(P)' and 'F(P)' will, obviously, depend on the latency between requesting data from the DMA and arrival of the requested data and also on the amount of data that could be received from other sources in the meantime.

The latency also means that a trace output device could make multiple requests to the DMA engine. The 'outstanding request flag' prevents this from happening.

Another way of tackling this latency problem would be that requesting data from a channel has two side-effects:
1) Space is reserved in the buffer for the requested data.

2) If the 'outstanding request flag' is set, the data is accepted unconditionally (because we have already reserved space for it). A variant of this is to say that the priority depends on the 'outstanding request flag': outstanding transactions raise the priority of a channel.

The technique of the trace output device requesting data from the data source may also be used independently or in combination with the other techniques described herein.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:
a data source configured to generate data; and
a trace output device coupled to said data source and configured to receive said data from said data source and to output trace data from said apparatus; wherein
said data source dynamically selects one of a plurality of priority levels to be associated with said data;
said trace output device is responsive to received data having a first level of priority to one of: (i) if said trace output device is ready to process said data, then accept said data from said data source; and (ii) if said trace output device is not ready to process said data, then stall acceptance of said data from said data source until said trace output device is ready to process said data; and
said trace output device is responsive to received data having a second level of priority to accept said data from said data source and, if said trace output device is not able to process said data, then to discard said data, wherein said trace output device comprises a data buffer memory configured to store said data prior to output of said data from said apparatus; and wherein (i) said trace output device is ready to process said data when said data buffer memory has empty capacity greater than or equal to N+F(P); and (ii) said trace output device is not ready to process said data when said data buffer memory has empty capacity less than N+F(P), where N is the number of bytes needed to store said data and F(P) is a function of P where P is a priority level of said data.

2. Apparatus as claimed in claim 1, wherein data associated with said first level of priority is output from said apparatus irrespective of whether or not said trace output device is ready to process said data when said data is sent from said data source to said trace output device.

3. Apparatus as claimed in claim 1, wherein data associated with said second level of priority is accepted from said data source irrespective of whether or not said trace output device is able to process said data such that timings of processing operations of said apparatus are not changed in dependence upon whether or not said trace output device is able to process said data.

4. Apparatus as claimed in claim 1, wherein F(P) is a monotonically increasing function.

5. Apparatus as claimed in claim 1, wherein F(P)=0 when said priority level of said data has highest priority.

6. Apparatus as claimed in claim 1, wherein said data source is a bus master, said trace output device is a bus slave and said data source and said trace output device are coupled by a bus interconnect.

7. Apparatus as claimed in claim 6, wherein said trace output device is a memory mapped slave device mapped to a plurality of memory addresses.

8. Apparatus as claimed in claim 7, wherein said data source writes said data to different memory addresses mapped to said trace output device to associate different priority levels with said data.

9. Apparatus as claimed in claim 1, wherein said data source is a main processor and said trace output device is a coprocessor coupled to said main processor.

10. Apparatus as claimed in claim 9, wherein said data is sent from said main processor to said coprocessor in response to a coprocessor instruction within an instruction stream of said main processor.

11. Apparatus as claimed in claim 10, wherein said coprocessor instruction specifies a priority level to be associated with said data.

12. Apparatus as claimed in claim 1, wherein said data source executes computer program instructions controlling a priority level associated with said data.

13. Apparatus as claimed in claim 1, wherein said trace output device is responsive to an override signal to change a level of priority associated with data received by said trace output device.

14. Apparatus as claimed in claim 1, wherein said trace output device is configured to request data from said data source according to a priority of said data source.

15. Apparatus as claimed in claim 14, where said priority of said data source is the same as said priority level of said data.

16. Apparatus for processing data comprising:
data source means for generating data; and
trace output means coupled to said data source means for receiving said data from said data source means and for outputting trace data from said apparatus; wherein
said data source means dynamically selects one of a plurality of priority levels to be associated with said data;
said trace output means is responsive to received data having a first level of priority to one of: (i) if said trace output means is ready to process said data, then accept said data from said data source means; and (ii) if said trace output means is not ready to process said data, then stall acceptance of said data from said data source means until said trace output device is ready to process said data; and
said trace output means is responsive to received data having a second level of priority to accept said data from said data source means and, if said trace output means is not able to process said data, then to discard said data, wherein said trace output means comprises a data buffer memory configured to store said data prior to output of said data from said apparatus; and wherein (i) said trace output means is ready to process said data when said data buffer memory has empty capacity greater than or equal to N+F(P); and (ii) said trace output means is not ready to process said data when said data buffer memory has empty capacity less than N+F(P), where N is the number of bytes needed to store said data and F(P) is a function of P where P is a priority level of said data.

17. A method of processing data comprising the steps of:
generating data with a data source;
receiving said data from said data source with a trace output device coupled to said data source; and
outputting trace data from said apparatus; wherein
said data source dynamically selects one of a plurality of priority levels to be associated with said data;
said trace output device is responsive to received data having a first level of priority to one of: (i) if said trace output device is ready to process said data, then accept said data from said data source; and (ii) if said trace output device is not ready to process said data, then stall acceptance of said data from said data source until said trace output device is ready to process said data; and said trace output device is responsive to received data having a second level of priority to accept said data from said data source and, if said trace output device is not able to process said data, then to discard said data, wherein said trace output device comprises a data buffer memory configured to store said data prior to output of said data from said apparatus; and wherein (i) said trace output device is ready to process said data when said data buffer memory has empty capacity greater than or equal to $N+F(P)$; and (ii) said trace output device is not ready to process said data when said data buffer memory has empty capacity less than $N+F(P)$, where N is the number of bytes needed to store said data and $F(P)$ is a function of P where P is a priority level of said data, said steps are implemented on a data processing apparatus.

* * * * *